US005802543A

United States Patent [19]

Shibayama

[11] Patent Number: 5,802,543

[45] Date of Patent: Sep. 1, 1998

[54] PAGING RECEIVER EMPLOYING MEMORY BANKING SYSTEM

[75] Inventor: Hiroaki Shibayama, Shizuoka, Japan

[73] Assignee: NEC Corporation, Tokyo, Japan

[21] Appl. No.: 637,492

[22] Filed: Apr. 25, 1996

[30] Foreign Application Priority Data

Apr. 28, 1995 [JP] Japan .................................... 7-105389

[51] Int. Cl.[6] .................................................... G06F 12/06

[52] U.S. Cl. ........................... 711/5; 711/1; 711/2; 711/3

[58] Field of Search .................................. 395/402, 405, 395/401, 403; 340/825.44; 380/9; 379/93; 711/1, 2, 3, 5

[56] References Cited

U.S. PATENT DOCUMENTS 5,249,220 9/1993 Moskowitz et al. ...................... 379/93
5,412,719 5/1995 Hamamoto et al. ........................ 380/9
5,426,424 6/1995 Vanden Heuvel et al. ........ 340/825.44

FOREIGN PATENT DOCUMENTS 0 338 317 10/1989 European Pat. Off. ........ G06F 12/06
0 338 317 A2 10/1989 European Pat. Off. ........ G06F 12/06
2 240 864 8/1991 United Kingdom ............. H04B 5/04
WO 89/06475 7/1989 WIPO ............................. H04Q 7/00

*Primary Examiner*—Eddie P. Chan
*Assistant Examiner*—Than V. Nguyen
*Attorney, Agent, or Firm*—Sughrue, Mion, Zinn, Macpeak & Seas, PLLC

[57] ABSTRACT

A paging receiver includes a receiver, a decoder 303, a central processing unit 102, a ROM 104 in which programs to be executed by the CPU and data are stored in a plurality of bank modes, a RAM 105, and a demodulated data outputting apparatus. The decoder includes a bank mode switching register 601 that is used to select a plurality of bank modes. The register stores an initial hardware value and a bank switch value that is used to select one of the plurality of bank modes upon initialization by software, and one of the plurality of bank modes is selected in accordance with the initial hardware value and the bank switch value by the software. When the capacity of the ROM is limited, the capacity of the ROM can be assured sufficiently only by selecting one of the bank modes, and software designing can proceed only after some change of design.

3 Claims, 10 Drawing Sheets

FIG. 7A

| DECODER INTERNAL ADDRESS \ DATA | $D_7$ | $D_6$ | $D_5$ | $D_4$ | $D_3$ | $D_2$ | $D_1$ | $D_0$ |
|---|---|---|---|---|---|---|---|---|
| 00 | | | | | | PBR2 | PBR1 | PBR0 |
| 01 | | | | | | | MBR1 | MBR0 |
| 02 | | | | | | | | CHMD |

FIG. 7B

| DECODER INTERNAL ADDRESS \ DATA | $D_7$ | $D_6$ | $D_5$ | $D_4$ | $D_3$ | $D_2$ | $D_1$ | $D_0$ |
|---|---|---|---|---|---|---|---|---|
| 00 | | | | | | — | PBR1 | PBR0 |
| 01 | | | | | | | MBR1 | MBR0 |
| 02 | | | | | | | | 0 |

FIG. 7C

| DECODER INTERNAL ADDRESS \ DATA | $D_7$ | $D_6$ | $D_5$ | $D_4$ | $D_3$ | $D_2$ | $D_1$ | $D_0$ |
|---|---|---|---|---|---|---|---|---|
| 00 | | | | | | PBR2 | PBR1 | PBR0 |
| 01 | | | | | | | MBR1 | MBR0 |
| 02 | | | | | | | | 1 |

FIG. 8A

| ADD. ACCESSED BY CPU / DECODER PIN | 0000~7FFF | 8000~9FFF | A000~BFFF | C000~FFFF | CONNECTION DESTINATION (DEVICE) |
|---|---|---|---|---|---|
| BANK0 | AB13 | MBRO | 0 | 0 | AB 13 |
| BANK1 | AB14 | MBR1 | 0 | 0 | AB 14 |
| BANK2 | PBRO | 0 | 0 | 0 | AB 15 |
| BANK3 | PBR1 | 0 | 0 | 0 | AB 16 |
| SELECTED DEVICE | ROM | RAM | DECODER | LCD DISPLAY UNIT | |

FIG. 8B

| ADD. ACCESSED BY CPU / DECODER PIN | 0000~3FFF | 4000~7FFF | 8000~9FFF | A000~DFFF | C000~FFFF | CONNECTION DESTINATION (DEVICE) |
|---|---|---|---|---|---|---|
| BANK0 | 0 | AB13 | MBRO | 0 | 0 | AB 13 |
| BANK1 | 0 | PBRO | MBR1 | 0 | 0 | AB 14 |
| BANK2 | 0 | PBR1 | 0 | 0 | 0 | AB 15 |
| BANK3 | 0 | PBR2 | 0 | 0 | 0 | AB 16 |
| SELECTED DEVICE | ROM | ROM | RAM | DECODED | LCD DISPLAY UNIT | |

PAGING RECEIVER EMPLOYING MEMORY BANKING SYSTEM

BACKGROUND OF THE INVENTION

1. Field of the Invention

This invention relates to a paging receiver, and more particularly to a paging receiver with an address decoding function which can make better use of the capacity of a ROM by using a software designing technique and a memory bank switching technique.

2. Description of the Related Art

Conventionally, a paging receiver of the type mentioned is designed by a process wherein a program capacity and a RAM capacity are roughly estimated based on system specifications and, when the program capacity is so large that it cannot be achieved with a conventional IC, a bank switching system is newly designed to implement a new IC.

FIG. 1 is a block diagram showing the construction of a conventional example of a paging receiver of the type mentioned, and FIG. 2 is a block diagram showing the inner construction of decoder 103 of the paging receiver.

The present conventional example includes radio unit 101 for demodulating a modulated wave received by means of an antenna, decoder 103 for decoding the demodulated wave received from radio unit 101, CPU 102 serving as a concentrated operation unit in the paging receiver, ROM 104 in which programs to be executed by CPU 102 and data are stored, RAM 105 serving as memories (task control memory, received message memory and so forth) for managing banks when CPU 102 accesses ROM 104, and LCD display unit 106 for displaying received data.

In connections between the components, CPU 102 is connected to decoder 103, ROM 104, RAM 105 and LCD display unit 106 by address bus 109, data bus 110 and control bus 111, and decoder 103 is connected to ROM 104 and RAM 105 by bank control bus 112. Radio unit 101 and decoder 103 are connected to each other by received data signal line 107 and radio unit control signal line 108. Decoder 103 is further connected to ROM 104, RAM 105 and LCD display unit 106 by chip select lines 113, 114 and 115, respectively, and connected to CPU 102 by interrupt control line 117.

The construction of the components, buses and control lines of the conventional example described above is the same as that of an embodiment of the present invention except decoder 103, which is hereinafter described. Therefore, details of the common construction are hereinafter described in the description of the preferred embodiment of the present invention, and here, decoder 103 is described in detail.

FIG. 2 shows the inner construction of decoder 103. Decoder 103 is composed of address decoder 201 and bank controller 202.

Address decoder 201 inputs an address signal from CPU 102 through address bus 109 and decodes the address signal to produce chip select signals for selecting the devices including ROM 104, RAM 105, LCD display unit 106 and decoder 103 and a bank control signal. The chip select signals are outputted in the order mentioned above through chip select lines 113, 114, 115 and 116, and the bank control signal controls bank controller 202 through bank control line 118.

Bank controller 202 has an address for setting a register value for performing bank control using the bank control signal, the address signal and data inputted from data bus 110, and writes a bank register value of the ROM or the RAM with a Write signal of control bus 111 to output a signal to bank control bus 112.

The conventional example described above has the following drawbacks.

1) Since an IC is designed with a single kind of bank mode, when the software volume after completion of software designing is so large that it cannot be accommodated in a prescribed ROM, much time is frequently spent for optimization of an algorithm and some other countermeasure to reduce the software volume.

2) Where the software volume is excessively large even after the software volume reduction attempt is completed, it is necessary to take further man-hours in designing a new IC.

SUMMARY OF THE INVENTION

It is an object of the present invention to provide a paging receiver wherein, in order to eliminate the drawbacks of the conventional example described above, a plurality of memory bank modes which take merits and demerits into consideration to the utmost are selectively set in advance so that program designing can be adapted variously in accordance with the capacity of a ROM to raise the efficiency in program production.

In order to achieve the object described above, according to the present invention, there is provided a paging receiver, which comprises a receiver for demodulating a modulated wave received by an antenna, a decoder for decoding a demodulated wave outputted from the receiver, a central processing unit serving as a concentrated operation unit in the paging receiver, a ROM in which programs to be executed by the central processing unit and data are stored in a plurality of bank modes, a RAM for managing a bank when the central processing unit accesses the ROM, and demodulated data outputting means, wherein the central processing unit accesses, each time it is to access the ROM, the ROM through the decoder and the decoder decodes an address signal inputted thereto from the central processing unit and outputs chip select signals to each of the ROM, the RAM and the demodulated data outputting means, the decoder including bank mode switching selection means for switchably selecting one of the plurality of bank modes.

In a preferred form of the present invention, the bank mode switching selection means has a hardware initial value and a bank switch value for selectively setting one of the plurality of bank modes upon initialization operation by software, and one of the plurality of bank modes is selectively set in accordance with one of the hardware initial value and a bank switch value by the software. The bank system switching selection means includes a register for electing, in selective setting of a bank mode, one of outputs of the plurality of bank modes.

BRIEF DESCRIPTION OF THE DRAWINGS

FIG. 7*a* is a map of registers employed in bank controller 502;

FIG. 7*b* is a map of effective registers in bank mode 1;

FIG. 7*c* is a map of effective registers in bank mode 2;

FIG. 8*a* is a table showing output values and connection destinations of bank control signals outputted from decoder 303 in bank mode 1;

FIG. 8*b* is a table showing output values and connection destinations of bank control signals outputted from decoder 303 in bank mode 2;

DETAILED DESCRIPTION OF THE PREFERRED EMBODIMENT

Figure 1:
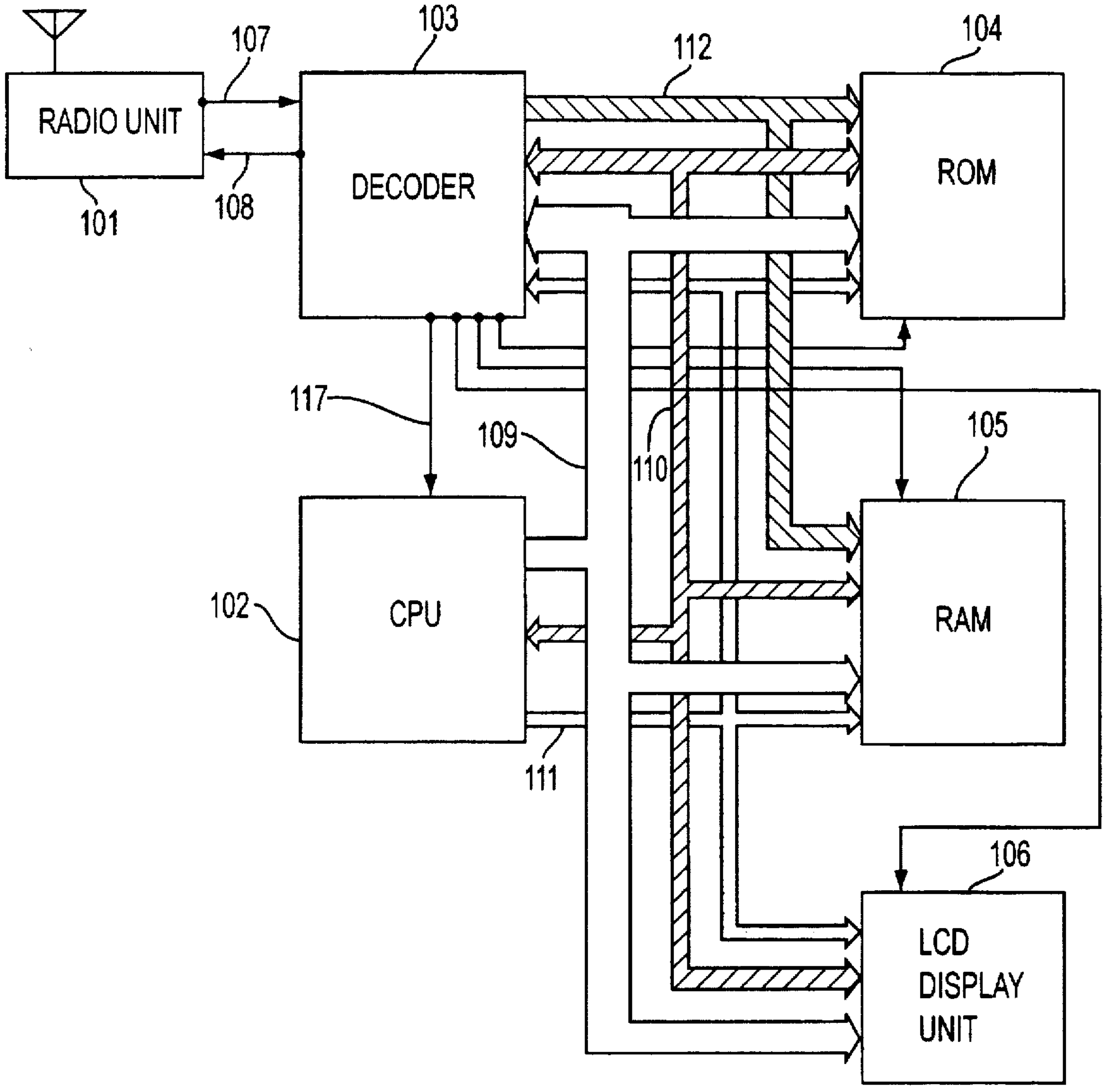
FIG. 1 (PRIOR ART)
FIG. 1 is a block diagram showing a construction of a conventional paging receiver.
Figure 2:
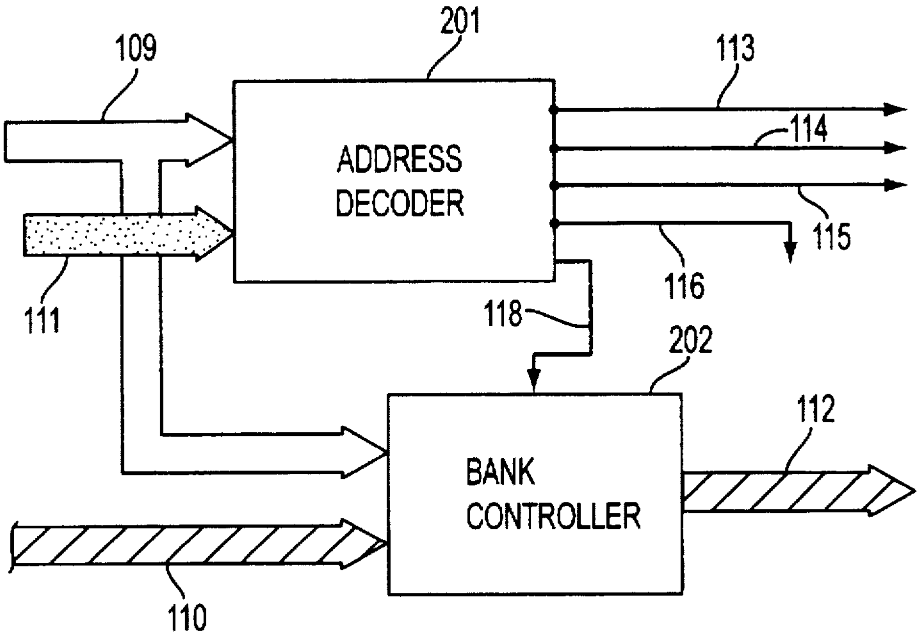
FIG. 2 (PRIOR ART)
FIG. 2 is a block diagram showing the construction of internal essential part of decoder 103 shown in FIG. 1.
Figure 3:
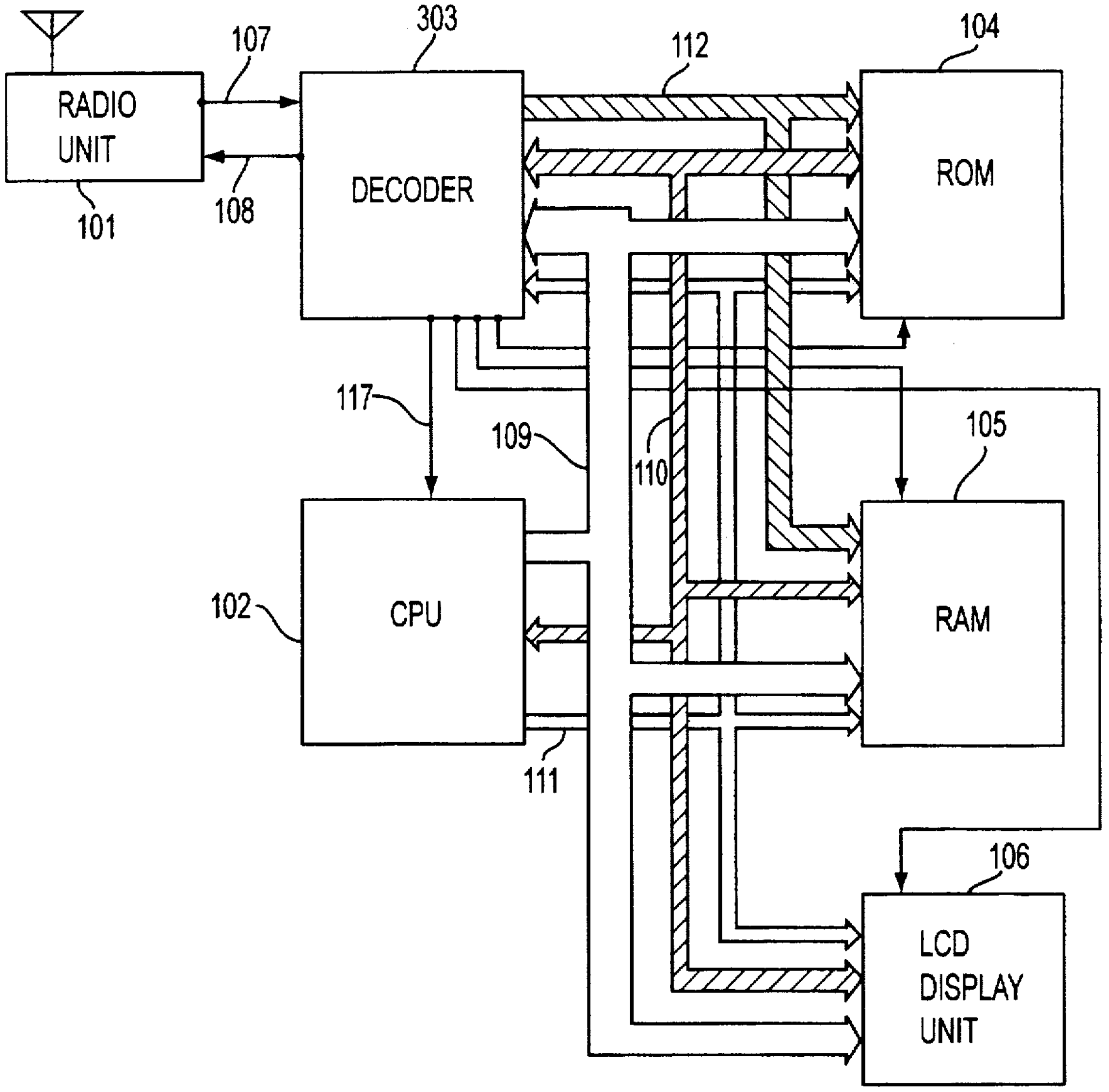
FIG. 3 is a block diagram showing the construction of a paging receiver of the present invention.

The construction of an embodiment of a paging receiver of the present invention shown in FIG. 3 is the same as that of the conventional example shown in FIG. 1 except decoder 303, and in the following description, the same reference numerals are used for common components.

CPU 102 is connected to decoder 303, ROM 104, RAM 105 and LCD display unit 106 through address bus 109, data bus 110 and control bus 111, and decoder 303 is connected to ROM 104 and RAM 105 through bank control bus 112.

Figure 4:
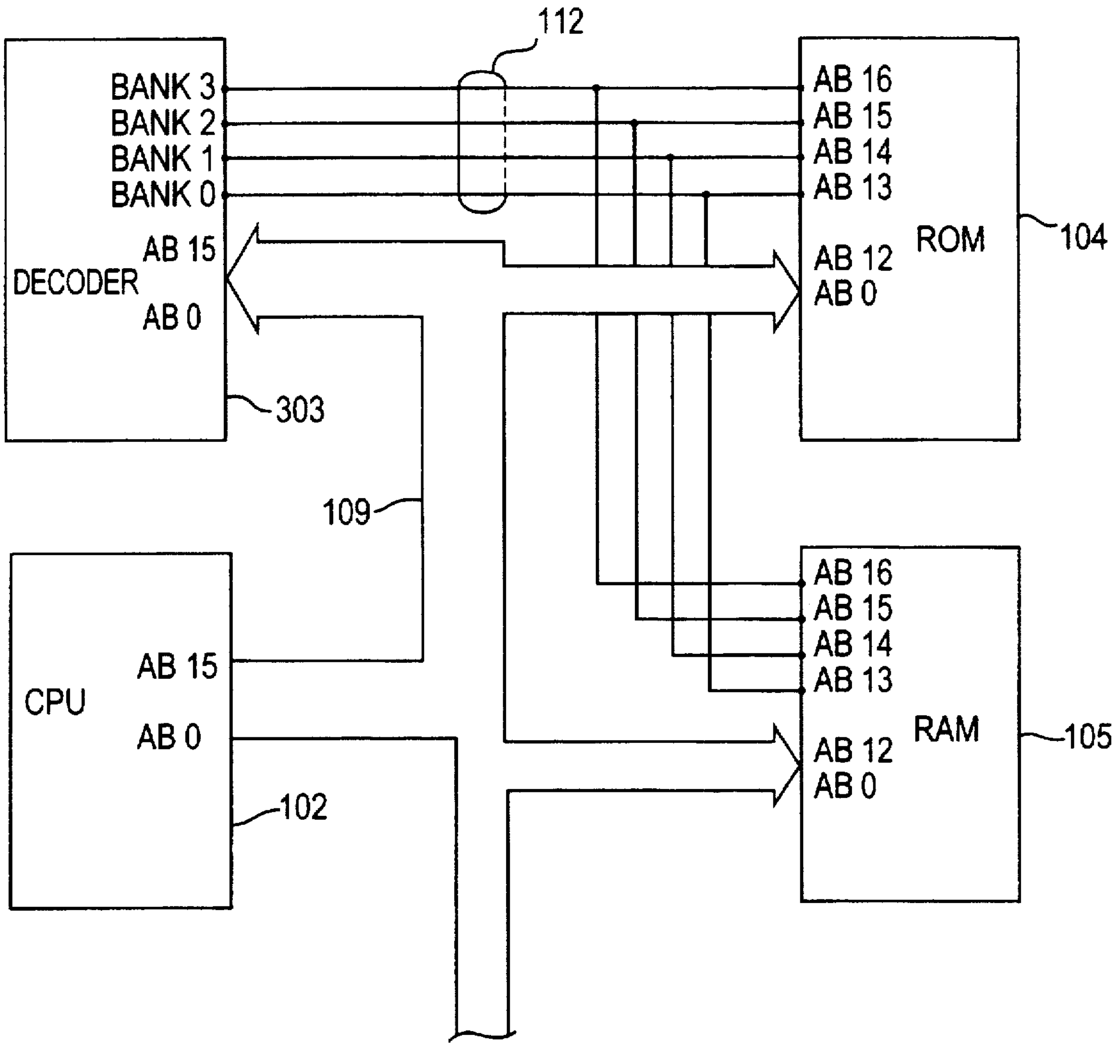
FIG. 4 is a block diagram showing actual connections of CPU 102, decoder 303, ROM 104 and RAM 105 to address bus 109 and bank control bus 112 in FIG. 3.

FIG. 4 is a detailed connection diagram of address bus 109 and bank control bus 112 among CPU 102 decoder 303, ROM 104 and RAM 105. From address pins AB0 to AB15 of CPU 102, an address signal of totaling 16 bits is outputted to address pins AB0 to AB15 of decoder 303, and an address signal of the lower 13 bits is outputted to address pins AB0 to AB12 of ROM 104 and RAM 105. Bank control bus 112 is composed of four bit lines which are connected between bank output pins BANK0, BANK1, BANK2, BANK3 of decoder 303 and address pins AB13, AB14, AB15, AB16 of ROM 104 and RAM 105, respectively.

Figure 5:
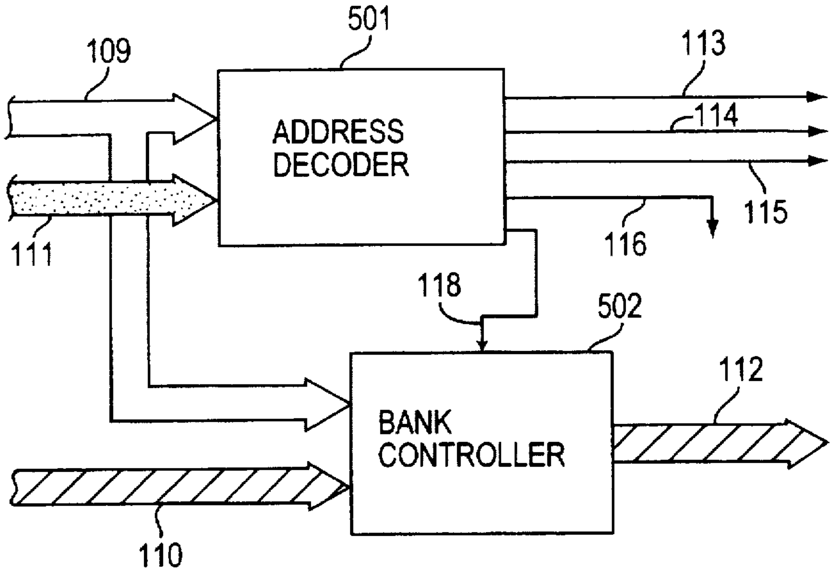
FIG. 5 is a block diagram showing the construction of internal essential part of decoder 303 shown in FIG. 3.

FIG. 5 shows an internal construction of decoder 303. Decoder 303 is composed of address decoder 501 and bank controller 502. Address decoder 501 outputs chip select signals through chip select lines 113, 114, 115 and 116 in order to selectively control ROM 104, RAM 105, LCD display unit 106 and the internal elements of decoder 303, respectively. In the present embodiment, since an example of bank control of the ROM and the RAM is described, description of control of the other devices is omitted.

Figure 6:
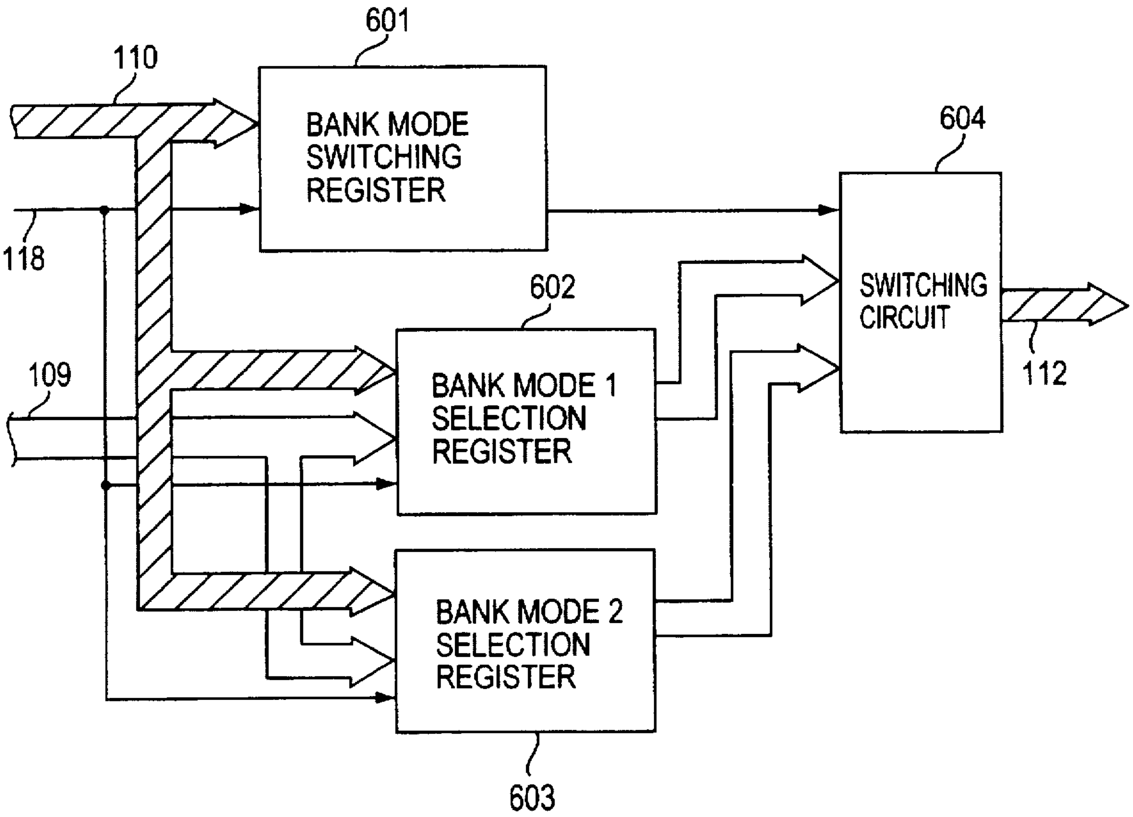
FIG. 6 is a block diagram showing the internal construction of bank controller 502 shown in FIG. 5.

Bank controller 502 is composed of, as shown in FIG. 6, bank mode switching register 601, bank mode 1 selection register 602, bank mode 2 selection register 603 and switching circuit 604. As shown in FIG. 7*a*, as decoder internal addresses, 02(hex) is allocated to bank mode switching register 601, and 00(hex) and 01(hex) are applied to both bank mode 1 selection register 602 and bank mode 2 selection register 603, for ROM 104 and RAM 105, respectively. In particular, 3 bits PBR2, PBR1, PBR0 are set to the 00(hex) address, 2 bits MBR1, MBR0 are set to the 01(hex) address, and 1 bit (CHMD) is set to the 02(hex) address in advance through data buses D7 to D0.

In the present embodiment, as memory bank modes, two kinds of bank modes including bank mode 1 and bank mode 2 are used. Details of contents of them are hereinafter described.

Switching circuit 604 performs switching between bank mode 1 and bank mode 2. When the value of CHMD (Change Mode) set to bank mode switching register 601 is 0, switching circuit 604 renders effective only bits PBR1, PBR0 of the set value of the 00(hex) address outputted from bank mode 1 selection register 602 (FIG. 7*b*), but when the value of CHMD changes to 1, switching circuit 604 performs switching to bank mode 2 selection register 603 to make valid all of bits PBR2, PBR1, PBR0 of the set value of the 00(hex) address outputted from bank mode 2 selection register 603 (FIG. 7*c*). In either case, switching circuit 604 outputs the effective value as a bank control signal for selecting a ROM bank to bank control bus 112. Also the RAM bank set value of the 02(hex) address is processed in a similar manner to perform bank control of the RAM.

Operation of the present embodiment is described below with reference to the drawings.

Decoder 303 is connected to radio unit 101 by received data signal line 107 and radio unit control signal line 108 so as to control radio unit 101 to receive data received by antenna. Decoder 303 analyzes the received data and sends a result of the analysis through interrupt control line 117 to CPU 102 to interrupt CPU 102. CPU 102 is connected to decoder 303, ROM 104, RAM 105 and LCD display unit 106 through the address bus 109, data bus 110 and control bus 111 so that processing such as interrupt processing may be performed through the buses. When an interrupt request is received, CPU 102 cooperates with RAM 105 to process data using address bus 109, data bus 110 and a read/write line of control bus 111. The processing programs and the data are written in ROM 104, and CPU 102 reads out them and executes necessary processing.

In this instance, decoder 303 automatically controls the banks so that the ROM capacity may be utilized to the utmost.

Since decoder 303 is set so that, when it is reset by CPU 102, it can perform reading beginning with the internal address 0, designation of a bank mode depends upon a set value of the CHMD bit at the address 02 accessed by decoder 303. In particular, when the CHMD bit is "0", bank mode 1 is selected, but when the CHMD bit is "1", bank mode 2 is selected.

A bank switching operation of the ROM is described as an example below.

FIGS. 8*a* and 8*b* show connection destinations and output values of the bank control lines of bank control bus 112 when the bank mode used is bank mode 1 and bank mode 2, respectively.

(1) When bank mode 1 is used (CHMD=0):

As described above, when the CHMD bit of bank system switching register 601 of decoder 303 is 0, if CPU 102 accesses ROM 104 with the addresses 0000 to 7FFF as seen in FIG. 8*a*, then address bit AB13 of the entire address inputted from CPU 102 is outputted from decoder side pin BANK0 to bank control bus 112, and similarly, address bit AB14 is outputted from pin BANKl, bit PBR0 is outputted from pin BANK2, bit PBR1 is outputted from pin BANK3, thus the register set value of bank mode 1 selection register 602 is read out Those 4 bits are used as an upper address signal to access ROM 104 together with lower address bits AB0 to AB12.

Figure 9A:
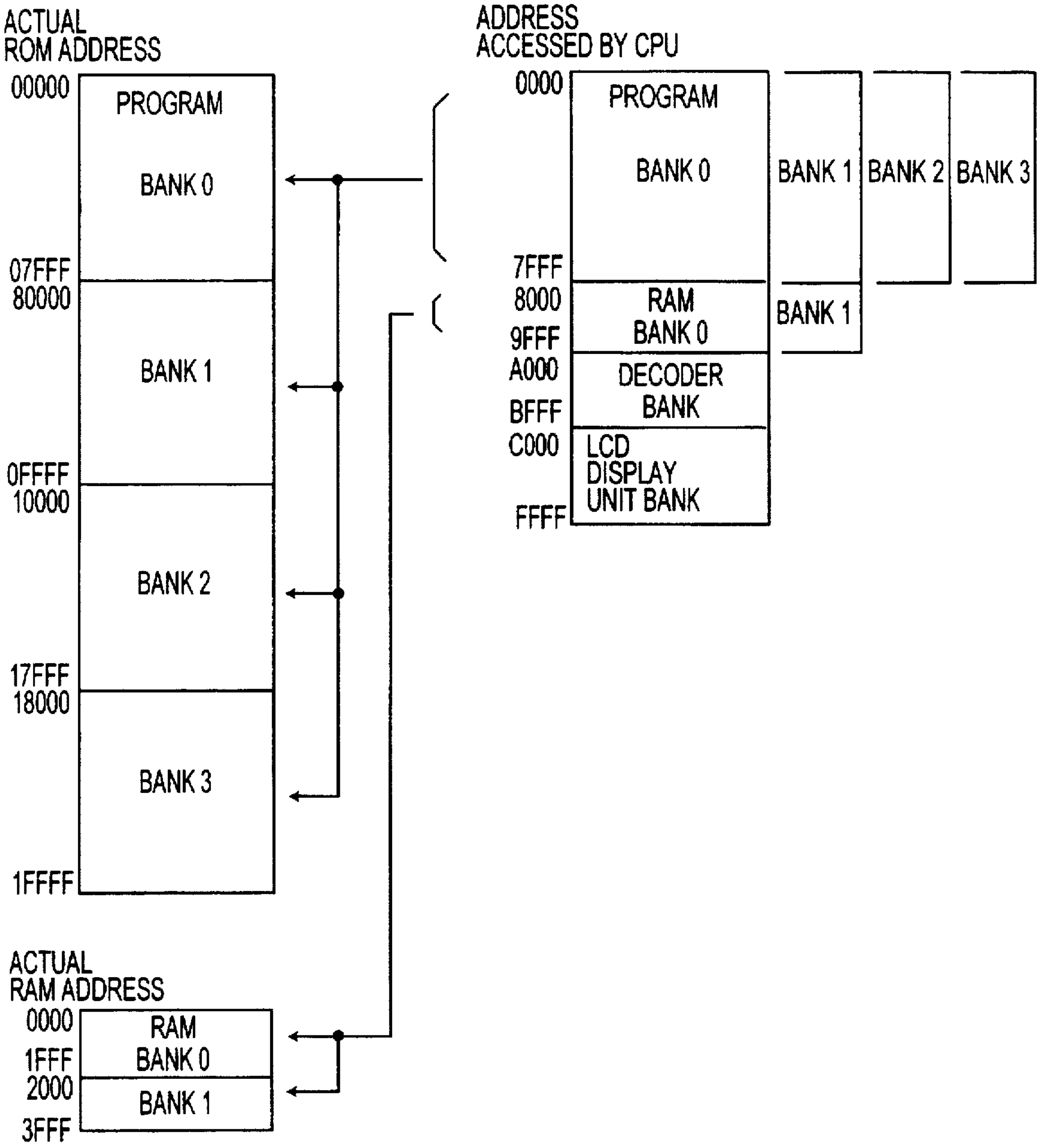
FIG. 9*a* is a diagrammatic view illustrating a corresponding relationship between a CPU address map and actual addresses of to ROM and the RAM according to bank mode 1.

In particular, when the register set value (PBR1, PBR0) is 00(hex), if CPU 102 accesses the 0000 to 7FFF addresses as seen in FIG. 9*a*, program bank 0 shown in FIG. 9*a* is selected and actual ROM addresses 0000 to 7FFF are accessed. On the other hand, if CPU 102 accesses the 0000 to 7FFF addresses when the register set value is 01(hex), program bank 1 is selected, and actual ROM addresses 08000 to 0FFFF(hex) are accessed. When the register set value is 02(hex), actual ROM addresses 10000 to 17FFF (hex) of program bank 2 are accessed. When the register set value is 03(hex), ROM addresses 18000 to 1FFFF(hex) of program bank 3 are accessed. Although also RAM 105 is accessed in a similar manner as described above, description of the accessing manner is omitted herein for brevity's sake.

Figure 9B:
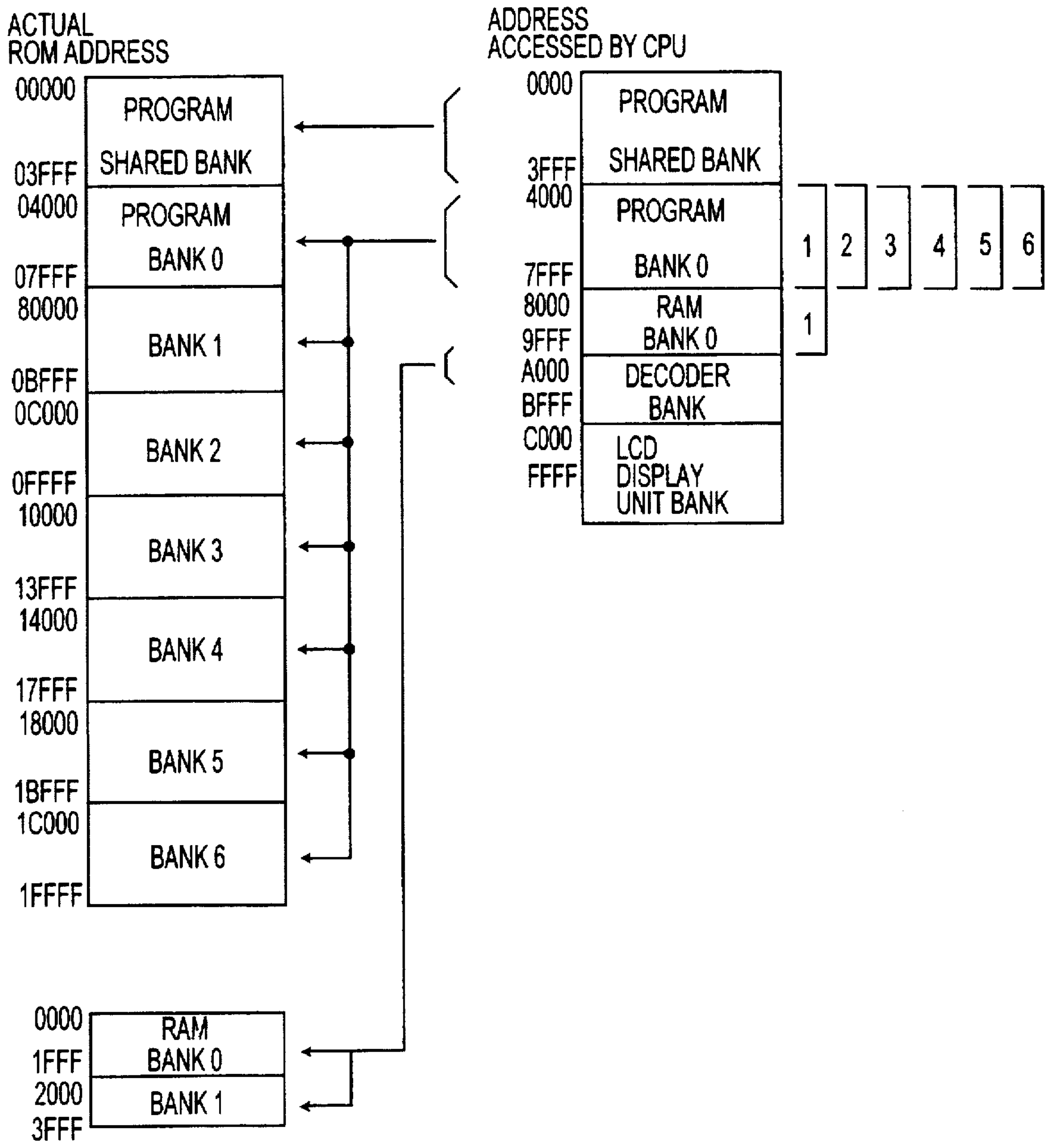
FIG. 9*b* is a diagrammatic view illustrating a corresponding relationship between a CPU address map and actual addresses of the ROM and the RAM according to bank mode 2.

(2) When bank system 2 is used (CHMD=1):

When the CHMD bit of bank mode switching register 601 of decoder 303 is 1, if CPU 102 accesses addresses 0000 to 3FFF(hex) as seen in FIG. 9*b*, 0 is outputted from pins BANK0 to BANK3 to select a program shared bank shown in FIG. 9*b* irrespective of the register set value (PBR2 PBR1, PBR0) of bank mode 2 selection register 603 as shown in FIG. 8*b*, and actual ROM addresses 00000 to 03FFF(hex) are accessed.

When 00(hex) is set to the register, if CPU 102 accesses 4000 to 7FFF(hex) addresses, a signal of address bit AB13 is outputted from pin BANK0, and 0 is set to pin BANK1, 0 is set to pin BANK2, and 0 is set to pin BANK3. Consequently, actual addresses 04000 to 07FFF of ROM 104 are accessed.

When 01(hex) is set to the register, the AB13 signal, 1, 0 and 0 are outputted so that actual addresses 08000 to 0BFFF(hex) of ROM 104 are accessed. When 02(hex) is set to the bank register, the AB13 signal, 0, 1 and 0 are outputted so that 0C000 to FFFF(hex) addresses of ROM104 are accessed. When 03(hex) is set to the register, the AB13 signal, 1, 1 and 0 are outputted so that 10000 to 13FFF(hex) of ROM104 are accessed. Also the other banks up to bank 6 can be accessed in a similar manner.

Figure 10A:
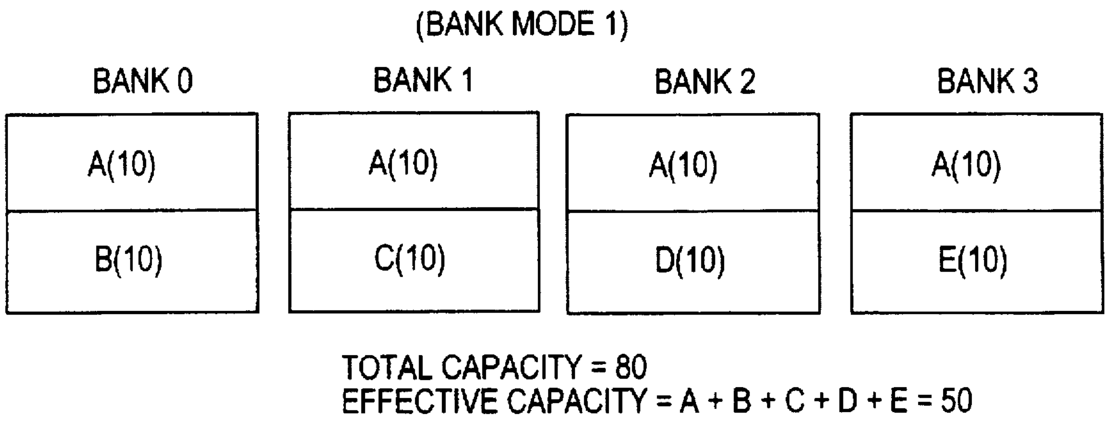
FIG. 10*a* is a diagrammatic view showing a construction of ROM banks according to bank mode 1.
Figure 10B:
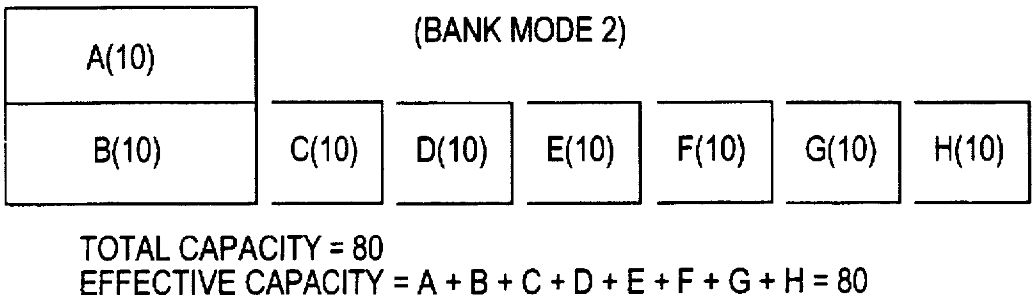
FIG. 10*b* is a diagrammatic view showing a construction of ROM banks according to bank mode 2.

FIGS. 10*a* and 10*b* are diagrammatic views illustrating contents and capacities of the banks of bank mode 1 (four bank system) and bank mode 2 (7+1 bank system) employed in the present embodiment, respectively.

While, according to bank mode 1 of FIG. 10*a*, each of banks 0 to 3 includes common monitor program A, according to bank mode 2 of FIG. 10*b*, monitor program A common to banks 0 to 7 is stored only in the shared bank. Accordingly, in the present example, where the total capacity of the ROM is 80, the effective portion of the capacity is 50 with the former mode, but with the latter mode, there is a merit that the entire capacity 80 can be used effectively.

However, as listed in Table 1 below, while the former mode has a merit in that it is easy to program, the latter mode has a demerit in that it is less easy to program. Consequently, programs suitable for situations can be designed in either mode.

TABLE 1

| | Bank Mode 1 (4 Bank Mode) | Bank Mode 2 (7+1 Bank Mode) |
|---|---|---|
| Merit | Easy to program (results in reduction in time) | Effective ROM capacity is large (large program can be made) |
| Demerit | Effective ROM capacity is small (large program cannot be made) | Not easy to program (much time is required) |

It is to be noted that, while, in the present embodiment, it is described that CHMD to be set to bank mode switching register 601 has a 1-bit length in order to switch between two kinds of bank modes, it can be recognized readily to those skilled in the art that, where CHMD includes a plurality of bits and a corresponding plural number of bank mode selection registers are provided, switching among a greater plural number of kinds of bank modes can be realized.

As described above, according to the present invention, since various bank modes which take merits and demerits into consideration to the utmost can be selectively set in advance, a program suitable for a situation can be designed in a various manner, and there is an advantage that the efficiency in production of a program can be raised.

What is claimed is:

1. A paging receiver, comprising a receiver for demodulating a modulated wave received by an antenna, a decoder for decoding a demodulated wave outputted from said receiver, a central processing unit serving as a concentrated operation unit in said paging receiver, a ROM in which programs to be executed by said central processing unit and data are stored in a plurality of bank modes a RAM for managing a bank when said central processing unit accesses said ROM, and demodulated data outputting means, wherein said central processing unit accesses, each time it is to access said ROM, said ROM through said decoder and said decoder decodes an address signal inputted thereto from said central processing unit and outputs chip select signals to each of the ROM, the RAM and the demodulated data outputting means, said decoder including bank mode switching selection means for switchably selecting one of said plurality of bank modes.

2. A paging receiver as claimed in claim 1, wherein said bank mode switching selection means has an initial hardware value and a bank switch value for selecting one of said plurality of bank modes upon initialization by software, and one of said plurality of bank modes is selected in accordance with said initial hardware value and said bank switch value by the software.

3. A paging receiver as claimed in claim 2, wherein said bank mode switching selection means includes a register that stores a change bank mode bit value which is used to select one of said plurality of bank modes.

* * * * *